3,397,192
ALKOXY- AND ARYLOXY-ETHYLATED POLYMERS OF HETEROCYCLIC N-VINYL MONOMERS AND PROCESS OF PREPARING THE SAME
Frederick Grosser, Midland Park, and Ashot Merijan, Clark, N.J., assignors to GAF Corporation, a corporation of Delaware
No Drawing. Filed May 18, 1966, Ser. No. 550,954
7 Claims. (Cl. 260—80.72)

ABSTRACT OF THE DISCLOSURE

Alkoxy- and aryloxy-ethylated polymers of heterocyclic N-vinyl monomers are provided which are insoluble in water but soluble in a variety of polar and nonpolar organic solvents and which are obtained by simultaneously polymerizing and alkoxy- or aryloxy-ethylating by heating one mole of a monomer of a 5- or 7-membered heterocyclic N-vinyl monomer having a carbonyl function adjacent to the nitrogen in its heterocyclic moiety or one mole of a comonomer mixture containing from 5 to 99 mole percent of said heterocyclic N-vinyl monomer and from 1 to 95 mole percent of a monoethylenically unsaturated polymerizable monomer with 0.05 to 10 moles of vinyl ether in solution of an inorganic solvent common to said monomer, comonomer mixture and vinyl ether in the presence of 0.025 to 0.2 mole of organic peroxide catalyst per mole of vinyl ether at a temperature of from about 80° to 200° C.

---

This invention relates to a new, novel and useful class of alkoxy- and aryloxy-ethylated polymers of heterocyclic N-vinyl monomers and to the process of preparing the same.

It is the principal object of the present invention to provide a new and useful class of alkoxy- and aryloxy-ethylated polymers (homo-, co- and ter-polymers) of heterocyclic N-vinyl monomers having solubility characteristics in a wide range of solvents, from polar to nonpolar, and to the process of preparing the same.

A further object is to provide the process of alkoxy- and aryloxy-ethylating polymers (homo- and co-polymers) of heterocyclic N-vinyl monomers with vinyl ethers so as to systematically control the solubility of the resulting polymers.

A further object is to provide a new class of alkoxy- and aryloxy-ethylated copolymers of heterocyclic N-vinyl monomers and vinyl ethers which have varying degrees of solubility in polar and nonpolar solvents, and to the process of preparing the same.

A further object is to provide a new class of alkoxy- and aryloxy-ethylated terpolymers of heterocyclic N-vinyl monomers, monoethylenically unsaturated polymerizable monomers and vinyl ethers having varying degrees of solubility in polar and nonpolar solvents, and to the process of preparing the same.

A further object is to provide a new process of simultaneously copolymerizing and alkoxy- or aryloxy-ethylating a heterocyclic N-vinyl monomer with a vinyl ether.

A still further object is to provide a new process of simultaneously terpolymerizing and alkoxy- or aryloxy-ethylating a mixture containing a heterocyclic N-vinyl monomer, monoethylenically unsautrated polymerizable monomer and a vinyl ether, or a mixture of two different heterocyclic N-vinyl monomers and a vinyl ether, so as to systematically control the solubility of the alkoxy- or aryloxy-ethylated terpolymer.

Other objects and advantages will become more clearly evident from the following description.

We have found that the foregoing objects are attained by two procedures. In the first, one mole of a polymer (homo- or co-polymer) of a heterocyclic N-vinyl monomer is alkoxy- or aryloxy-ethylated with 0.05 to 10 moles of a vinyl ether. In the second procedure, one mole of a heterocyclic N-vinyl monomer is simultaneously copolymerized and alkoxy- or aryloxy-ethylated with 0.05 to 10 moles of a vinyl ether, or one mole of a mixture of two different heterocyclic N-vinyl monomers or one mole of a mixture of a heterocyclic N-vinyl monomer and a monoethylenically unsaturated polymerizable monomer are simultaneously terpolymerized and alkoxy- or aryloxy-ethylated with 0.05 to 10 moles of a vinyl ether.

In the first procedure polymers (homo- and co-polymers) of heterocyclic N-vinyl monomers are readily alkoxy- or aryloxy-ethylated by treating one mole of a homopolymer or a copolymer of a heterocyclic N-vinyl monomer with 0.05 to 10 moles of a vinyl ether in solution of an inert organic solvent common to the polymer and vinyl ether in the presence of 0.025 to about 0.2 mole of a tertiary-alkyl peroxide or a hydroperoxide as catalyst per mole of vinyl ether at a temperature of from 80° to 200° C. for a period of time ranging from about 3 to about 48 hours. The resulting solution of the alkoxy- or aryloxy-ethylated polymer may be employed as such, or, if desired, the organic solvent may be removed by vacuum distillation or other conventional solvent evaporation techniques.

The homopolymers of heterocyclic N-vinyl monomers that are alkoxy- or aryloxy-ethylated with a vinyl ether in accordance with the first procedure of the present invention are those which contain a carbonyl function adjacent to the nitrogen in the heterocyclic moiety such as, for example, homopolymers of N-vinyl succinimide, N-vinyl diglycolylimide, N-vinyl glutarimide, N-vinyl-3-morpholinone, N-vinyl-5-methyl-3-morpholinone, N-vinyl-5-ethyl-3-morpholinone, N-vinyl oxazolidone, etc., and N-vinyl 5-, 6- and 7-membered lactams characterized by the following formula:

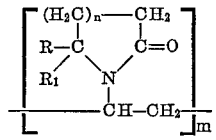

wherein R and $R_1$ are selected from the group consisting of hydrogen, methyl and ethyl, $n$ is an integer of from 1 to 3, and $m$ represents the average molecular weight as determined by relative viscosity measurements which are designated as K values.

The viscosity coefficient, K, which is fully described in Modern Plastics, 23, No. 3, 157–61, 212, 214, 216 and 218 (1945), is calculated as follows:

$$\frac{\log \eta_{rel}}{c} = \frac{75 K_o^2}{1+1.5 K_{oc}} + K_o$$

and $K=1000K_o$, where $c$ is the concentration in grams per 100 ml. of polymer in solution and the $\eta_{rel}$ is the viscosity of the solution compared to solvent.

Other homopolymers containing a lactam ring that are alkoxy- or aryloxy-ethylated with a vinyl ether include those prepared by the homopolymerization of comparable monomers of N-vinyl 5-, 6- and 7-membered thiolactams, N-acryloyl-pyrrolidone, -piperidone and -caprolactam; N-acryloyl - 5 - methyl-pyrrolidone, N-acrylol-6-methylpiperidone and N-acryloyl-7-methyl caprolactam and their corresponding 5-, 6- and 7-ethyl derivatives; N-acryloxy-methyl-pyrrolidone, -piperidone and -caprolactam; N-methacryloxy - ethyl - pyrrolidone, -piperidone and -caprolactam; N-methacryloxy-methyl-5-methyl-pyrrolidone, -6-methyl-piperidone and -7-methyl-caprolactam; N-methacrylamidomethyl-, N-methacrylamidoethyl-, N-methacrylamidopropyl- and N-(N-phenylacrylamidopropyl)-pyrrolidones, -piperidones and -caprolactams.

The homopolymers of the foregoing heterocyclic N-vinyl monomers and monomers of N-vinyl lactams characterized by the foregoing formula are readily obtained by conventional homopolymerization. The various species of N-vinyl lactams that may be homopolymerized includes N-vinyl pyrrolidone; N-vinyl-5-methyl pyrrolidone; N-vinyl-5-ethyl pyrrolidone; N-vinyl-5,5-dimethyl pyrrolidone; N-vinyl-5,5-diethyl pyrrolidone and N-vinyl-5-methyl-5-ethyl pyrrolidone; N-vinyl piperidone; N-vinyl-6-methyl piperidone; N-vinyl-6-ethyl piperidone; N-vinyl-6,6-dimethyl piperidone; N-vinyl-6,6-diethyl piperidone and N-vinyl-6-methyl-6-ethyl piperidone; N-vinyl caprolactam, N-vinyl-7-methyl caprolactam; N-vinyl-7,7-dimethyl caprolactam; N-vinyl-7-ethyl caprolactam; N-vinyl-7,7-diethyl caprolactam and N-vinyl-7-methyl-7-ethyl caprolactam.

For the purpose of the present invention we employ homopolymers of heterocyclic N-vinyl monomers having a K value ranging from about 10 to 140, preferably from about 30 to 100. These homopolymers are readily obtained by conventional homopolymerization procedures of the foregoing heterocyclic N-vinyl monomers described in United States Patents 2,265,450; 2,317,804; 2,335,454 and many others too numerous to mention in which working examples are given.

All of the homopolymers of heterocyclic N-vinyl monomers including N-vinyl lactams characterized by the foregoing general formula are soluble in water, alcohols, and certain class of organic solvents, but insoluble in the aliphatic and aromatic hydrocarbons.

Copolymers obtained copolymerizing 5 to 99 mole percent of any one of the foregoing heterocyclic N-vinyl monomers with 1 to 95 mole percent of a monoethylenically unsaturated polymerizable monomer and having a K value from about 10 to 140 are also readily alkoxy- or aryloxy-ethylated with vinyl ethers in accordance with the present invention to yield products having solubility characteristics in polar and non-polar solvents.

The various monoethylenically unsaturated polymerizable monomers, which are copolymerized with any one of the aforementioned heterocyclic N-vinyl monomers in the conventional manner and which will yield copolymers that are readily alkoxy- or aryloxy-ethylated with vinyl ethers in accordance with the present invention, include vinyl esters such as vinyl acetate, vinyl propinate, vinyl butyrate, vinyl isobutyrate, vinyl lactate, vinyl caproate, vinyl caprylate, vinyl oleate, and vinyl stearate; vinyl phenylacetate, vinyl β-phenylbutyrate, vinyl α-naphthoate, acrylonitrile; vinyl ketones; vinyl cyclohexane; styrene; 2-vinyl pyridine, 4-vinyl pyridine; acrylic acid; acrylate ester monomers of the formula

wherein $R_2$ represents either an aryl or a straight or branched alkyl of at least one carbon atom or an alkoxyalkyl in which the number of carbon atoms in the alkyl groups may range from about 3 carbon atoms up.

As examples of such acrylate esters, the following are illustrative: methyl, ethyl, propyl, isopropyl, butyl, isobutyl, s-butyl, 2-ethyl-1-butyl, amyl, 3-pentyl, 2-methyl-1-pentyl, 4-methyl-2-pentyl, hexyl, 2-ethyl-hexyl, heptyl, 2-heptyl, octyl, 2-octyl, nonyl, 5-ethyl-2-nonyl, decyl, 2-methyl-7-ethyl-4-undecyl, dodecyl, tetradecyl, hexadecyl, octadecyl, 2-methoxyethyl, 2-ethoxyethyl, 2-butoxyethyl acrylate, phenyl acrylate, o-tolyl acrylate, tetrahydrofurfuryl acrylate and the like. Methacrylic and acrylamide monomers may also be employed such as methacrylic acid, methyl methacrylate, cyclohexyl methacrylate, isobutyl methacrylate, isoamyl methacrylate, β-methoxy ethyl methacrylate and α-(o-chlorophenyl) ethyl methacrylate, β-phenoxy-ethyl methacrylate, α-phenylethyl methacrylate, phenyl methacrylate, o-cresyl methacrylate, p-cyclohexylphenyl methacrylate, 2-nitro-2-methyl propyl methacrylate, diethylaminoethyl methacrylate, ethylidene acetate methacrylate and glycidyl methacrylate, including esters of halo acrylic acids, such as methyl-2-chloro-acrylate, ethyl-α-chloro-acrylate, phenyl-α-chloro-acrylate, α-ethylacrylic acid; methacrylonitrile; N-alkyl and N-aryl substituted acrylamides such as N-methyl acrylamide, N-ethyl acrylamide, N-propyl acrylamide, N-n-butyl acrylamide, N-n-dodecyl arcylamide, N-n-octadecyl acrylamide, N,N-dimethyl acrylamide, N,N-diethyl acrylamide, N,N-di-n-butyl acrylamide, N,N-di-isobutyl acrylamide, N-cyclohexyl acrylamide, N,N-dicyclohexyl acrylamide, N-phenyl acrylamide, N-p-nitro-phenyl acrylamide, N-α-naphthyl acrylamide, N-β-naphthyl acrylamide, N-methyl-N-phenyl acrylamide, N,N-diphenyl acrylamide, N-benzyl acrylamide, N,N-di-benzyl acrylamide; and grafted monomers of the type disclosed in United States Patents 3,029,219; 3,035,009; 3,036,033, and the like.

A mixture consisting of from 5 to 99 mole percent of any one of the foregoing heterocyclic N-vinyl monomers and from 1 to 95 mole percent of a different heterocyclic N-vinyl monomer, such as, for example, N-vinyl lactam with either N-vinyl succinimide, N-vinyl-3-morpholinone, and the like, may also be copolymerized and the resulting copolymer alkoxy- or aryloxy-ethylated in accordance with the present invention.

It is to be noted that any copolymer containing not less than 1 mole percent of a monoethylenically unsaturated polymerizable monomer and the remainder a heterocyclic N-vinyl monomer and which copolymer is soluble in the inert organic solvent is readily alkoxy- or aryloxy-ethylated in accordance with the present invention. From our numerous experiments connected with the present invention, we found that the configuration of the foregoing monoethylenically unsaturated monomers, and numerous others, is immaterial since they all copolymerize in the aforementioned proportions with the heterocyclic N-vinyl monomers and yield copolymers which are soluble in the inert organic solvent or mixture thereof and which are readily alkoxy- or aryloxy-ethylated.

Where insolubility in water is desired, it is preferred that a copolymer be employed in which the heterocyclic N-vinyl monomer enumerated above be present in an amount not less than 5 mole percent, based on the moles of said copolymer. Copolymers prepared within this amount of the heterocyclic N-vinyl monomer will contain sufficient active protons in the heterocyclic rings for reaction with a vinyl ether to yield alkoxy- or aryloxy-ethylated polymers which are insoluble in water.

The vinyl ethers, i.e., vinyl alkyl ethers and vinyl aryl ethers employed as alkoxy- and aryloxy-ethylating agents in the first procedure and as copolymerizable with the foregoing heterocyclic N-vinyl monomers or terpolymerizable monomers with the heterocyclic N-vinyl monomers and monoethylenically unsaturated polymerizable as well as alkoxy- and aryloxy-ethylating agents in the second procedure have the following formula:

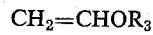

wherein $R_3$ represents a straight or branched chain alkyl of from 1 to about 30 carbon atoms, e.g., methyl, ethyl, propyl, isopropyl, n-butyl, sec-butyl, t-butyl, 2-ethylbutyl, 1,3-dimethylbutyl, n-amyl, isoamyl, 1-methyl-2-methylpropyl, diisopropylmethyl, hexyl, 2-ethylhexyl, octyl, 1-methylheptyl, nonyl, n-decyl, 1-methyl-4-ethyloctyl, n-tetradecyl, n-hexadecyl, n-octadecyl, oleyl, eicosyl, ceryl, myricyl, etc., and aryl, e.g., phenyl, o-, m-, and p-cresyl, α-naphthyl, β-naphthyl, etc. It is to be noted that the alkyl may be substituted by an alkoxy or chloro group such as methoxy, ethoxy, etc., or by one or more chlorine atoms. The aryl may be in the form of aralkyl or chloro aryl such as o-ethylphenyl, benzyl, p-chlorophenyl, 2,4-dichlorophenyl, 2,4,6-trichlorophenyl, etc. The alkyl may be in the form of a cycloalkyl (alicyclic) such as cyclohexyl, p-butyl cyclohexyl, etc.

As examples of such vinyl alkyl- and vinyl aryl-ethers, the following are illustrative: vinyl methyl ether, vinyl ethyl ether, vinyl propyl ether, vinyl butyl ether, vinyl isobutyl ether, vinyl amyl ether, vinyl-2-methoxyethyl ether, vinyl-2-chloro-ethyl ether, vinyl octyl ether, vinyl octadecyl ether; vinyl eicosyl ether, vinyl ceryl ether, vinyl myricyl ether, etc., (prepared by the vinylation of eicosyl alcohol and other high-boiling alcohols such as ceryl from Chinese wax and myricyl from carnauba wax by acetylene, in accordance with the procedure described in U.S. 2,045,393), vinyl-2-methoxy-ethyl ether, vinyl-2-chloroethyl ether, vinyl cyclohexyl ether, vinyl phenyl ether, vinyl-o-cresyl ether, vinyl-o-ethyl phenyl ether, vinyl-p-chlorophenyl ether, vinyl-α-naphthyl ether, etc. Many of these vinyl ethers are commercially available and the others can be readily prepared by the conventional methods well-known to the polymer art, i.e., texts, Journals, and patents. It is to be further noted that there is no limitation with respect to the size or configuration of the alkyl and aryl groups in the vinyl ether or the nature of the substituents on the alkyl or aryl groups to achieve alkoxy- and aryloxy-ethylation by the process of the present invention. Such groups and further substituent groups thereof do not enter into the reaction.

Instead of the vinyl alkyl ethers and vinyl aryl ethers enumerated above, vinyl ethers from substituted aliphatic alcohols of the formula:

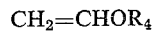

wherein $R_4$ represents either $-CH_2CH_2OCH_3$; $-CH_2CH_2OC_2H_5$;
$-(CH_2CH_2O)_2CH_3$; $-(CH_2CH_2O)_2C_2H_5$;
$-CH_2OCH_3$; $-CH_2CH_2Cl$, etc.; vinyl ethers from amino alcohols, such as, vinyl ether of ethanolamine, diethanolamine, β-morpholino-ethanol, etc., vinyl thioethers (vinyl sulfides); and the like may be employed to give a new variety of useful polymeric products.

Instead of employing 0.05 to 10 moles of a specific vinyl ether in the reaction, a mixture of two or more different vinyl ethers may be used as will be noted in one of the illustrative working examples.

As noted above, an inert organic solvent is employed in the alkoxy- or aryloxy-ethylation which is common to the polymers (homo- and co-polymers) and vinyl ether of the first procedure and common to the monomers and vinyl ether of the second procedure. As solvents, various alcohols, such as, methanol, ethanol, propanol, isopropanol, butanol, sec-butanol, amyl alcohol, hexanol, 2-ethyl-1-hexanol, ethylene glycol, 1,2-butanediol, 1,4-butanediol, etc., may be employed. Other inert solvents such as diethylene glycol, ethylene glycol monomethyl ether and the like may also be employed. It is to be noted that the nature or character of the organic solvent is immaterial so long as it forms a solution with the polymer and vinyl ether and is not susceptible to alkoxy- or aryloxy-ethylation.

The amount of inert organic solvent employed is not critical. Any amount which will yield a solution of the preformed polymer (homo- or co-polymer) or the monomer or comonomer mixture and vinyl ether will suffice. However, for purposes of expediency, we found that for every part by weight of said polymer, monomer or comonomer mixture, from one to ten parts of organic solvent, either by volume or by weight, is sufficient to yield a workable solution.

As peroxide catalyst (initiator) in the reaction of the first and second procedure, any one of the known tertiary-alkyl organic peroxides and hydroperoxides such as, for example, di-t-butyl peroxide, t-butyl perbenzoate, di-ti-butyl perphthalate, t-butyl-pentamethyl-ethyl peroxide, t-butyl-triphenylmethyl peroxide, bis-(triphenylmethyl) peroxide, 2,5-dimethyl-hexyl-2,5-dihydroperoxide, 2,5-di-methyl-2,5-di(t-butyl peroxy) hexane, 2,5-dimethylhexyl-2,5-di(peroxy benzoate), t-butyl hydroperoxide, paramenthane hydroperoxide and the like may be used.

Where low-boiling vinyl ethers, i.e., those boiling below 70° C., are employed in the reaction, pressure equipment must be used. In such case the organic peroxide catalyst, and the polymer (homo- or co-polymer) of heterocyclic N-vinyl monomer or the monomer of the heterocyclic N-vinyl monomer alone or in admixture, as noted above, in solution of the inert organic solvent, are added into a stainless steel rocker bomb. The low-boiling vinyl ether is then charged to the bomb and the bomb heated and maintained at a temperature of from about 80° C. to 200° C. for a period of time ranging from 3 to 48 hours. The pressure developed in the bomb may range from 50 to 1000 p.s.i.g. After cooling to room temperature, the contents of the bomb are stripped of solvent and volatiles by vacuum distillation or other solvent evaporation techniques.

However, where it is desired that the alkoxy- or aryloxy-ethylated product be obtained in solution of a high-boiling aliphatic liquid hydrocarbon, the reaction mixture is subjected to vacuum distillation and the removed inert organic solvent is simultaneously replaced by a saturated aliphatic hydrocarbon having a boiling point higher than the organic solvent. After the organic solvent has been removed, there is obtained a solution of the alkoxy- or aryloxy-ethylated polymer in solution of the aliphatic hydrocarbon. Saturated aliphatic hydrocarbons having a boiling point higher than the organic solvent employed are legion and commercially available. Hence no difficulty should be encountered in the selection of such hydrocarbon in preparing a solution of the alkoxy- or aryloxy-ethylated polymers.

The consumption of the vinyl ether in the reactions of the foregoing two procedures may range from 75% to 100%. When a polymer (homo- or co-polymer) of a heterocyclic N-vinyl monomer is reacted with a vinyl ether, a polymer is obtained in which some or all of the heterocyclic N-vinyl moieties constituting the polymer contain at least one or more alkoxyethyl or aryloxyethyl groups. Mono-alkoxyethylation or mono-aryloxyethylation predominantly takes place when a high molar ratio of polymer to either vinyl alkyl ether or vinyl aryl ether is employed in the reaction. The mono-alkoxyethylation or mono-aryloxyethylation takes place at random positions in the heterocyclic N-vinyl monomer moiety of the polymer yielding isomeric 1:1 adducts. With a homopolymer of a heterocyclic N-vinyl monomer, such as, for example, of N-vinyl lactam, random mono-alkoxy- or aryloxy-ethylation takes place on the carbon atoms alpha and omega to the carbonyl and alpha-vinyl carbon atom of the heterocyclic N-vinyl moiety in said homoploymer in the following manner:

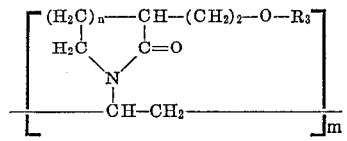

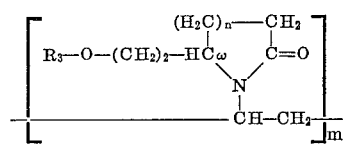

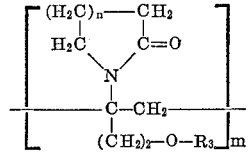

wherein $R_3$ and $m$ and $n$ have the same values as above.

Where the homopolymer of the heterocyclic N-vinyl monomer contains 1 or 2 alkyl groups of from 1 to 2 carbon atoms in omega position to the carbonyl in the said heterocyclic moiety, as characterized by R and $R_1$ above, random mono-alkoxy- or aryloxy-ethylation does not take place in this position. Instead it takes place on the carbon atom alpha to the carbonyl and α-vinyl carbon atom of the heterocyclic moiety.

When a high molar ratio of a vinyl ether to a homopolymer of heterocyclic N-vinyl monomer is employed in the reaction, such as, for example, of N-vinyl lactam, isomeric di-, tri- and poly-alkoxy- or aryloxy-ethylation takes place at the aforeindicated sites. Di- and tri-alkoxy- or aryloxy-ethylation are exemplified as follows:

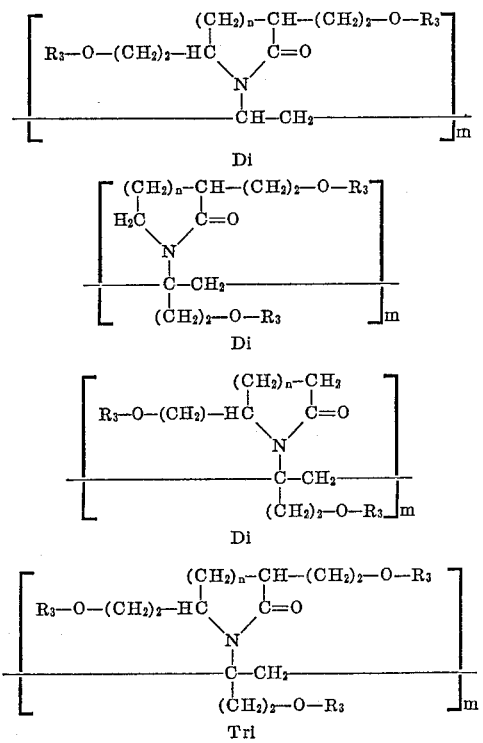

wherein $R_3$ and $m$ and $n$ have the same values as above.

Since propagation occurs at the given active sites, i.e., one or more additional moles of vinyl ether add to the first mole of vinyl ether which had added to the heterocyclic moiety, such propagation is termed poly-alkoxy- or aryloxy-ethylation as distinguished from mono-, di- and tri-alkoxy- or aryloxy-ethylation. The tendency towards propagation increases as the ratio of vinyl ether to the heterocyclic N-vinyl moiety increases and as the chain length of $R_3$ of the vinyl ether decreases. This propagation is exemplified with a homopolymer of N-vinyl lactam by the following illustration:

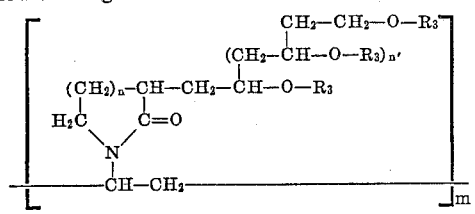

wherein $m$, $n$ and $R_3$ have the same values as above and $n'$ has a numerical value of from 1 to 10.

When the polymeric material of the first procedure is a copolymer of a heterocyclic N-vinyl monomer and a mono-ethylenically unsaturated polymerizable monomer and such copolymer is reacted with a vinyl ether, alkoxy- or aryloxy-ethylation in the heterocyclic N-vinyl monomer moiety takes place at the active sites as above shown as well as on one or more active sites of the monoethylenically unsaturated copolymerized monomer. The active sites of the latter will vary depending upon the structure of such comonomer. The active sites of such comonomers include α-carbon to a carbonyl functionality, α-carbon to a nitrile functionality, α-carbon atom to an ester oxygen of the alcohol portion of a vinyl ester and N-α-carbon atom of an amide functionality. This may be exemplified with a copolymer of N-vinyl-2-pyrrolidone and vinyl acetate by the following illustration:

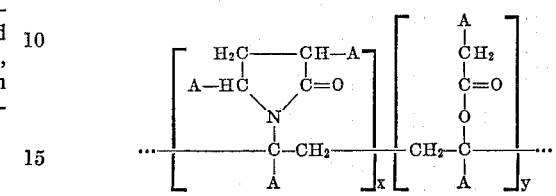

wherein the A's are independently selected from hydrogen and alkoxyethyl or aryloxyethyl, $x$ represents 5 to 99 mole perecnt and $y$ represents 1 to 95 mole percent.

From the foregoing description, it will be readily appreciated, depending upon the amount of vinyl ether employed, that alkoxy- and aryloxy-ethylated polymers of heterocyclic N-vinyl monomers are obtained containing at least one or more alkoxyethyl or aryloxyethyl groups at random positions in the heterocyclic moieties of the homopolymer as well as in the comonomer moieties of the copolymer.

In addition to the alkoxy-ethylated and aryloxy-ethylated polymers, as above described, there is obtained to a small extent a homopolymer of the alkyl vinyl ether or aryl vinyl ether employed in the reaction and addition products of peroxide decomposition fragments to vinyl ethers. Since the homopolymer of the alkyl vinyl ether or aryl vinyl ether is also soluble in the same solvents as the alkoxy-aryloxy-ethylated polymeric N-vinyl lactam, it cannot be removed. However, the presence of such a small amount of homopolymer does not detract in any way from the uses to which the alkoxy- and aryloxy-ethylated polymeric N-vinyl lactams are put.

The alkoxy- and aryloxy-ethylated polymers, prepared in accordance with the present invention, differ from the polymers of heterocyclic N-vinyl monomers free from lower alkyl substituents in the heterocyclic moiety as characterized by R and $R_1$ above and polymers of such heterocyclic N-vinyl monomers containing 1 or 2 lower alkyl groups in the heterocyclic moiety, in that the latter two polymers are water soluble, whereas those containing at least 1 alkoxy ethyl of from 4 carbon atoms up, or at least 1 aryloxy ethyl group in the heterocyclic N-vinyl moiety are insoluble in water, but soluble in non-polar solvents such as, for example, petroleum ether, hexane, light mineral oils, kerosene, higher alcohols such as hexanol and the like.

When one mole of a heterocyclic N-vinyl monomer is simultaneously copolymerized and alkoxy- or aryloxy-ethylated with 0.05 to 10 mols of a vinyl ether in solution of an inert organic solvent and in the presence of 0.025 to 0.2 mole of organic peroxide per mole of vinyl ether at 80° to 200° C., in accordance with the second procedure, a copolymer is obtained in which some or all of the heterocyclic N-vinyl moieties contain one or more alkoxyethyl or aryloxyethyl groups. For example, with N-vinyl-2-pyrrolidone and a vinyl ether, the resulting copolymer may be illustrated as follows:

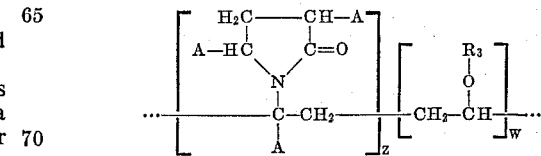

wherein the A's are independently selected from hydrogen or alkoxyethyl or aryloxyethyl and at least one of the A's is said alkoxyethyl or aryloxyethyl, $R_3$ has the same value as above, Z represents 100 mole percent of the N-vinyl-2-pyrrolidone charged and W has a numerical value of at least one, as will be noted hereinafter.

Similarly, in the second procedure, instead of employing one mole of a heterocyclic N-vinyl monomer, one mole of a mixture of two different heterocyclic N-vinyl monomers or one mole of a mixture consisting of 5–99 mole percent of a heterocyclic N-vinyl monomer and 1–95 mole percent of a monoethylenically unsaturated polymerizable monomer may be simultaneously terpolymerized and alkoxy- or aryloxy-ethylated with 0.05 to 10 moles of a vinyl ether in solution of an inert organic solvent in the presence of 0.025 to 0.2 mole of organic peroxide per mole of vinyl ether at 80°–200° C. for a period of 3 to 48 hours. The alkoxy- or aryloxy-ethylated terpolymer resulting from such simultaneous procedure may be illustrated, while employing, for example, one mole of a comonomer mixture of N-vinyl-2-pyrrolidone and ethyl acrylate with 0.05 to 10 moles of vinyl ether, as follows:

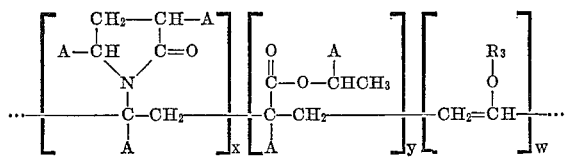

wherein the A's are independently selected from hydrogen or alkoxyethyl or aryloxyethyl and at least one of the A's is said alkoxyethyl or aryloxyethyl, $R_3$ has the same value as above, and the relationship of $x$ and $y$ with respect to each other in the terpolymer is from 5–99 mole percent for $x$ and from 1–95 mole percent for $y$, and $w$ has a numerical value of at least one. The precise value of $w$ in the alkoxy- or aryloxy-ethylated copolymer or terpolymer prepared in accordance with the second procedure of the present invention is difficult to determine. It will be appreciated that since the mole ratio of vinyl ether may range from 0.05 to 10 moles per mole of heterocyclic N-vinyl monomer or a mixture of such monomer with another comonomer, painstaking and time-consuming effort would be required to determine with accuracy the exact amount of vinyl ether that actually copolymerizes or terpolymerizes in each case and the exact amount that is actually consumed in the alkoxy- or aryloxy-ethylation of the active sites. From the results of our systematic study, which consisted of solvent fractionation, thermal degradation, vapor phase chromotography (VPC), infrared (IR) and nuclear magnetic resonance (NMR) spectroscopy, we have arrived at the conclusion that alkoxy- and aryloxy-ethylated copolymers and terpolymers are obtained by the simultaneous copolymerization or terpolymerization and alkoxy- and aryloxy-ethylation of heterocyclic N-vinyl monomers or in admixture with other polymerizable monomers in which the value of $w$ in the copolymeric or terpolymeric structure is at least one.

Where it is desired that the alkoxy- or aryloxy-ethylated copolymer or terpolymer obtained by the second procedure be supplied in solution of a high-boiling aliphatic liquid hydrocarbon, mineral or lubricating oil, the simultaneous copolymerization or terpolymerization and alkoxy- or aryloxy-ethylation with a vinyl ether, according to the second procedure, is conducted in any one of the foregoing solvents and when the reaction is about complete, the reaction mixture is subjected to vacuum distillation and the removed solvent and volatiles replaced by said liquid hydrocarbon in the same manner as is done in the case of the alkoxy- or aryloxy-ethylation of preformed polymers (homo- and co-polymers) of heterocyclic N-vinyl monomers in accordance with the first procedure described above.

The following examples will show how the various preformed polymers (homo- and co-polymers) of heterocyclic N-vinyl monomers are alkoxy- and aryloxy-ethylated with vinyl ethers and how the various monomers of heterocyclic N-vinyl monomers and comonomer mixtures are copolymerized and terpolymerized and alkoxy- or aryloxy-ethylated to yield the new class of products having varying degrees of solubility in polar and nonpolar solvents.

EXAMPLE 1

Into a one-liter, four-necked reaction flask equipped with stirrer, thermometer, reflux condenser and nitrogen inlet, following a thorough nitrogen purge, the following ingredients were charged:

Poly(N-vinylpyrrolidone) (K–30)=55.5 grams (0.5 mole)
Methyl isobutyl carbinol=100.0 grams (solvent)
Vinyl octadecyl ether [1]=143.0 grams (0.5 mole)
Di-t-butyl peroxide=10.0 grams (0.068 mole)

[1] The vinyl octadecyl ether used in this reaction is actually a mixture of 65% vinyl octadecyl ether and 35% vinyl cetyl ether by weight, with an average molecular weight of 285.7.

The resulting solution was heated and maintained at 120–140° C. for ten hours. The contents after cooling were analyzed and found to contain 1.8% vinyl octadecyl ether by weight of the solution corresponding to 5.5 grams of the vinyl ether only (96.1% consumption). The contents were subjected to vacuum stripping with final stripping conditions of 140–150° C./1.0 mm. Hg for one-half hour. The product (residue) thus obtained was a clear, viscous and amber-colored fluid weighing 175 grams. It had a nitrogen content of 3.91% corresponding to 31.0 weight percent of poly(N-vinylpyrrolidone) in the product. The product is soluble in all hydrocarbon solvents such as heptane, toluene, kerosene and mineral oil. Its number average molecular weight is 11,000.

EXAMPLE 2

Into a one-half liter, four-necked reaction flask equipped with stirrer, thermometer, reflux condenser and nitrogen inlet, following a thorough nitrogen purge, the following ingredients were charged:

Poly(N-vinyl piperidone)=37.5 grams (0.3 mole)
n-Hexanol=100.0 grams (solvent)
Vinyl dodecyl ether=85.0 grams (0.4 mole)
2,5-dimethyl-2,5-di(t-butylperoxy) hexane-95%=11.0 grams (0.036 mole)

The mixture was heated and maintained at 130–150° C. for sixteen hours and then cooled and analyzed. Residual monomer analysis was found to be 0.9% as vinyl dodecyl ether by weight of the solution, corresponding to 2.1 grams only (97.5% consumption of the vinyl ether). The contents were subjected to vacuum stripping with final stripping conditions of 140–155° C. at 0.5–1.0 mm. Hg for one-half hour. The product thus obtained weighed 114.0 grams, was clear and almost colorless and very viscous. It is soluble in all hydrocarbons and analyzed for 3.7% nitrogen, corresponding to 33.0 weight percent poly(N-vinyl piperidone) in the product.

EXAMPLE 3

Into a one-half liter, four-necked reaction flask equipped with stirrer, thermometer, reflux condenser and nitrogen inlet, following a thorough nitrogen purge, the following ingredients were charged:

N-vinyl caprolactum=44.5 grams (0.32 mole)
n-Amyl alcohol=125.0 grams (solvent)
Azobisisobutyronitrile=0.5 gram The contents were heated and maintained at 80–90° C. for six hours and then a sample was withdrawn and analyzed for residual monomer. Analysis indicated 1.6% residual N-vinyl caprolactam by weight of the solution, corresponding to 94% polymerization of the vinyl monomer.

The polymeric solution was cooled and after the addition of the following ingredients it was heated back again:

Vinyl cetyl ether = 107.0 grams (0.4 mole)
t-Butyl hydroperoxide = 75% = 9.6 grams (0.08 mole)

After maintaining the above mixture at reflux (115–125° C.) for ten hours, the contents were cooled and analyzed for residual vinyl ether. By analysis, the solution was found to contain 0.69% as vinyl cetyl ether by weight, corresponding to 1.98 grams or 98.1% consumption of the vinyl ether charged.

The product solution was then subjected to stripping in vacuum with final stripping conditions of 145–160° C./0.5 mm. Hg for one-half hour. The product thus obtained weighed 137.5 grams and was an amber viscous fluid. It is soluble in a wide range of polar and non-polar solvents, such as alcohols, ketones, ethers, hydrocarbons (aliphatic and aromatic) and mineral oil. Its nitrogen content was found to be 3.16% corresponding to 31.4 weight percent poly(N-vinyl caprolactam) in the product.

EXAMPLE 4

Into a one-liter, four-necked reaction flask equipped with stirrer, thermometer, reflux condenser and nitrogen inlet, following a thorough nitrogen purge, the following ingredients were charged:

N-vinyl pyrrolidone = 120.0 grams (1.08 mole)
Methyl methacrylate = 30.0 grams (0.3 mole)
Ethanol = 225.0 grams (solvent)
Azobisisobutyronitrile = 0.5 gram The contents were heated and maintained at reflux (80–90° C.) for two hours and then a second addition of 0.5 gram azo catalyst was made and refluxing continued for four additional hours. Residual monomer analysis carried on at this time indicated no trace of the methacrylate and only 0.2% by weight as N-vinylpyrrolidone, corresponding to 0.75 gram of the latter.

To the copolymer solution thus obtained was then added the following ingredients:

Vinyl isobutylether = 150.0 grams (1.5 mole)
t-Butyl peroctoate = 16.2 grams (0.075 mole)
(t-butylperoxy-2-ethylhexanoate)

The above mixture was heated back and maintained at reflux for eight hours and then cooled. Residual vinyl ether was analyzed and found to be 2.2% as vinyl isobutyl ether by the weight of the solution, corresponding to 12.0 grams of the unreacted vinyl ether or 92% consumption. The product solution was then subjected to stripping in atmospheric pressure initially followed by in vacuum with final stripping conditions of 160–175° C. at 0.5–1.0 mm. Hg for 45 minutes. The product (the residue) was discharged at 100–110° C. on a stainless steel tray and allowed to cool. The product became a yellowish, hard brittle solid at room temperature. It weighed 251 grams and analyzed for 6.0% nitrogen, corresponding to 59.5% of the 80/20 N-vinylpyrrolidone/methyl methacrylate copolymer in the isobutoxyethylated copolymer. The product is soluble in all alcohols, ketones, halogenated hydrocarbons and in aliphatic and aromatic hydrocarbons.

EXAMPLE 5

Into a one-liter, four-necked reaction flask equipped with stirrer, thermometer, reflux condenser and nitrogen inlet, following a thorough nitrogen purge, the following ingredients were charged:

5-methyl-N-vinylpyrrolidone = 75.0 grams (0.6 mole)
N-vinyl succinimide = 75.0 grams (0.6 mole)
n-Butyl alcohol = 250 grams (solvent)
Azobisisobutyronitrile = 1.0 gram The mixture was heated and maintained at 80–90° C. After three hours another addition of 0.5 gram of the azo catalyst was made and polymerization continued for four more hours. The solution was then cooled and analyzed. There was found only 0.7% residual N-vinyl monomer corresponding to 2.8 grams. To this polymer solution was then added the following materials:

Vinyl dodecyl ether = 318.0 grams (1.5 mole)
Di-t-butyl peroxide = 14.6 grams (0.1 mole)

The contents were heated and maintained at reflux for 24 hours. Analysis for residual vinyl dodecyl ether at this time indicated the presence of 2.6% vinyl dodecyl ether by weight of solution, corresponding to only 19.0 grams unreacted vinyl ether. The contents were subjected to stripping in vacuum with final conditions of 140–155° C./0.5 mm. Hg for one-half hour. The product remaining in the flask was a clear, brown and quite viscous fluid at room temperature. It weighed 420 grams and analyzed for 3.98% nitrogen corresponding to 35.5% copolymer of the two N-vinyl monomers in the alkoxyethylated product. The product is soluble in a wide range of polar and non-polar solvents, including mineral oil, but insoluble in water.

EXAMPLE 6

Into a one-half liter, four-necked reaction flask equipped with stirrer, thermometer, reflux condenser and nitrogen inlet, following a thorough nitrogen purge, the following ingredients were charged:

N-vinyl succinimide = 62.5 grams (0.5 mole)
Methyl isobutyl carbinol = 120.0 grams (solvent)
Vinyl cetyl ether = 161.0 grams (0.6 mole)
Di-t-butyl peroxide = 9.0 grams (0.061 mole)

The above mixture was heated and maintained at 120–140° C. for twelve hours and then cooled and analyzed. Analysis indicated no trace of N-vinyl succinimide but the presence of only 1.4% of vinyl cetyl ether by weight of the solution, corresponding to 4.9 grams of the unreacted ether (97% consumption). As the product was to be evaluated in lubricating applications, the solvent and volatiles were stripped in vacuum while simultaneously 180 grams 100 sec. solvent were added into the flask from a dropping funnel (final stripping conditions of 140–150° C./1 mm./½ hour). The product thus obtained (about 50% in oil) was clear, amber and viscous fluid.

EXAMPLE 7

Into a one-liter, stainless steel shaker bomb, purged with nitrogen, a solution of the following ingredients was charged and the bomb sealed:

N-vinylpyrrolidone = 200.0 grams (1.8 mole)
Isopropanol = 300.0 grams (solvent)
Vinyl isobutyl ether = 70.0 grams (0.7 mole)
Di-t-butyl peroxide = 10.0 grams (0.068 mole)

The bomb was heated with shaking and the contents maintained at 130–140° C. for fourteen hours. The bomb was then cooled and vented. A sample was withdrawn and analyzed. No residual N-vinyl pyrrolidone or vinyl isobutyl ether could be detected in the polymeric solution. The contents were transferred into a beaker, diluted to 10% solids by addition of water (white emulsion resulted on addition of water) and spray dried. The dry white powdery product thus obtained was of 97.5% solids and had 9.8% nitrogen, corresponding to 77.8% polymerized N-vinyl pyrrolidone moieties in the product. It is insoluble in water (although dispersible) and hydrocarbons, but soluble in amides and alcohols, ketones, and halogenated hydrocarbons. It has a number average molecular weight of 17,000.

EXAMPLE 8

Into a one-liter, four-necked reaction flask equipped with stirrer, thermometer, reflux condenser and nitrogen inlet, following a thorough nitrogen purge, the following ingredients were charged:

N-vinylpyrrolidone=90.0 grams (0.81 mole)
Ethyl acrylate=60.0 grams (0.6 mole)
Methyl isobutyl carbinol=200.0 grams
Di-t-butyl peroxide=10.0 grams (initial)
Vinyl cetyl ether=335.0 grams (1.25 mole)

The mixture was heated (vigorous reflux started at 100° C. but subsided as temperature increased) and maintained at 125–140° C. for three hours and then another 10.0 grams of peroxide added and reaction continued (total peroxide=20.0 grams, 1.37 moles). After a total of sixteen hours of reaction time, the contents were cooled and analyzed. No residual N-vinyl-pyrrolidone or ethyl acrylate could be detected. There was found 0.9% vinyl cetyl ether by weight of the solution corresponding to only 6.3 grams unreacted vinyl ether.

The contents were then subjected to stripping in vacuum with final stripping conditions of 135–150° C. at 1.0 mm. Hg for one-half hour. The product remaining in the flask was an amber, clear, viscous fluid weighing 443 grams. The product was discharged while hot into a jar containing 440 grams 100 sec. solvent to give an oily solution for evaluation as sludge dispersant in lubricating oils.

EXAMPLE 9

Into a one-liter, stainless steel shaker bomb, purged with nitrogen, a solution of the following ingredients was charged and the bomb sealed:

N-vinylpyrrolidone=111.0 grams (1.0 mole)
Vinyl acetate=28.6 grams (0.333 mole)
Vinyl isooctyl ether=156.0 grams (1.0 mole)
Ethanol=200 grams
Di-t-butyl peroxide=14.0 grams (0.096 mole)

The bomb was heated with shaking and the contents maintained at 125–140° C. for 16 hours. The bomb was then cooled, vented and the contents transferred into a one-liter reaction flask and analyzed. No residual N-vinyl-pyrrolidone, vinyl acetate or vinyl isooctyl ether could be detected. The contents were subjected to stripping at atmospheric pressure and in vacuum. The final stripping conditions in vacuum were 140–160° C./0.5 mm. Hg for three-quarters of an hour. The product remaining in the flask was discharged while at 100° C. It weighed 265 grams and became a clear flexible solid on cooling to room temperature. The product thus obtained analyzed for 4.9% nitrogen, corresponding to 39% polymerized N-vinyl pyrrolidone moieties in the product. It is soluble in all aliphatic and aromatic hydrocarbons, halogenated hydrocarbons, ketones, esters and alcohols.

EXAMPLE 10

Into a one-liter, stainless steel shaker bomb, purged with nitrogen, a solution of the following ingredients was charged and the bomb sealed:

N-vinylpyrrolidone=150.0 grams (1.35 moles)
Vinyl phenyl ether=50.0 grams (0.41 mole)
Isopropanol=300 grams (solvent)
Di-t-butyl peroxide=9.0 grams (0.061 mole)

The bomb was heated with shaking and the contents maintained at 125–135° C. for twelve hours. Then it was cooled, vented and a sample withdrawn and analyzed. Residual monomer analysis indicated no trace of N-vinyl pyrrolidone and only 1.5% vinyl phenyl ether by the weight of solution corresponding to only 7.6 grams of the vinyl ether. The contents were transferred into a stainless steel tray and the tray placed in vacuum oven. The oven was maintained at 120–130° C./10–15 mm. Hg for sixteen hours. The yellowish solid product thus obtained was of 95.0% solids and weighed 197 grams. It is insoluble in hydrocarbons and in water, but soluble in amides, ketones and alcohols. It analyzed for 9.8% nitrogen corresponding to 77.8% of polymerized N-vinylpyrrolidone moieties in the as is product.

The alkoxy- and aryloxy-ethylated polymers, as above prepared, hereinafter referred to for sake of brevity as reaction products, have numerous new and useful applications. The reaction products display emollient characteristics, i.e., softening and soothing effects when applied to the skin and the appendages of the skin. In view of this characteristic, they are excellent additives to soaps and cosmetic preparations of the cleansing, conditioning end embellishing type which will impart a smooth texture as well as a softening and soothing effect to the skin and skin appendages. The homopolymers and copolymers can be used in place of, and in addition to, petroleum hydrocarbons, i.e., mineral oils, petrolatums and paraffin waxes. They are not only soluble in these petroleum hydrocarbons, but also soluble in other unctuous materials such as fatty acid; stearic, myristic, oleic acids, etc.; glyceryl monostearate (Glycosterin); lanolin (wool fat); beeswax and other animal and vegetable waxes; higher alcohols, such as hexanol myristyl alcohol, etc.; ethylene glycol; methyl ethyl ketone, Cellosolve, butyrolactone, etc., which are employed in toiletry preparations of this type. They are readily emulsified by the usual reagents employed in toiletry manufacture. By virtue of this solubility, emulsifiability and broad compatibility with other components of the toiletry preparation, they substantially reduce or eliminate the drying tendency of mineral oils and petrolatums present in such preparations. The presence of the additive (reaction product) in toiletry preparations containing paraffin wax eliminates the clogging of pores. Regardless whether the toiletry preparation contains any one or all of these petroleum hydrocarbons, vegetable oils, lanolin, and/or other unctuous components, or is free from such components, etc., the presence of the additive in such preparation imparts a much smoother texture to it with the attendant softening and soothing effect when applied to the skin and a softening effect when applied to skin appendages.

The amount of reaction product that is employed to effect the desired results (smoother texture with softening and soothing effects) ranges from about 1% to about 50% by weight based on the total weight of the completed toiletry preparation. The reaction products are added at any stage of manufacture of cold creams, cleansing creams, emollient creams, finishing creams, skin-softening lotions, hand cleaners, lubricating creams, overnight creams, absorption-base creams, hand creams and lotions, foot creams, baby creams, baby skin oils; special creams such as, astringent creams, bleaching creams, acne creams; protective creams (industrial creams), vanishing creams, foundation creams, brushless shaving creams, shaving preparations, after-shave lotions and sprays, medicated creams, deodorants and anti-perspirants, such as deodorant creams and lotions, roll-on deodorants, sunburn preventives, suntan preparations, paste or lotion rouges, cream rouges, massage oils, facial masks, depilatories, i.e., hair removers (epilating wax compositions) and hair removing creams, paste or lotion face makeup, face powders; eye makeup, i.e., eye shadows and eyebrow creams; fingernail creams and cleaners, hair bleaches and tints, cuticle softeners, hair conditioners, wave sets, hair dressings, hair brilliantines; hair oils, hair sprays, creams and shampoos, nail polish removers, lipsticks, perfume sticks, facial soaps, synthetic soap bars, antiseptic soaps (tincture of green soap), insect repellents, protective hand creams, waterless hand cleaners, dentifrice, pet shampoos, bath talcs, and the like.

Toiletry preparations containing the reaction product render the preparation smoother in texture and easier in application to the skin and its appendages (hair and nails). After application to the skin or scalp, the preparations leave the skin soft and pliable with a soothing effect which remains after the preparation is removed by washing with soap and water. After application to the hair, the preparation deposits a film which renders the hair soft, smooth, lustrous and alive-looking. The soft and smooth effects remain after washing with soap and water and enhance the manageability of the hair. After application of the nail preparations, the nails are smooth and the adjacent skin rendered soft and pliable with a soothing effect.

The reaction products are effective pigment dispersers and act as color receptors. In hair preparations, the presence of the reaction product improves the softness, water repellency and manageability of the hair. In hair conditioners, the reaction products may be added to creams, foams or gels and the resulting preparations pressurized with nitrogen, argon, or the usual liquefied fluoro-chlorohydrocarbons.

In view of their solubility in hydrocarbons, mineral oils, etc., the reaction products are particularly adaptable for use as hot melts alone or in combination with paraffin waxes as coatings for various fibrous materials. Extruded films from such reaction products, either alone or with waxes and resins, may be composited to paper and other fibrous materials. The reaction products are compatible with a wide variety of resins, waxes, and polymers at room or elevated temperatures. They are useful as binders and saturants in hardboard and particle board.

The reactions products are useful for the protection of wires and cables in the form of outer jackets and sheaths. Films or coatings of such reactions polymers are also useful as liners for metal or fiber drums for shipping moist, dusty or corrosive products. They are also useful in electrical equipment such as in electric cable insulation, in potting dopes for capacitor elements, and as insulating coatings, sealing compounds, and in moisture-proofing coils, resistors and paper capacitors; as caulking compounds, spreader-sticker for insecticidal compositions, water-proofing sealants, adhesives, paper coatings, and as dispersants for inks and dye pastes. They are useful in leather treatment, as dye assistants, textile water-proofing, textile warp size, and the like.

Emulsions of the reaction products are especially useful in the impregnation of paper. When mixed in amounts ranging from about 1 to 3% by weight in light mineral oils, the reaction products function effectively as penetrants in the removal of rusty and frozen nuts and bolts.

The reaction products are especially adaptable in dye stripping, as pigment dispersants and protective colloids, temporary protective coatings, paper additives and coatings, binders for detergent briquettes and as binders for tablets and as color dispersants in tablet coating.

The reaction products are useful in dispersing gums, resins and various types of polymers. They are particularly adaptable in lubricating oils as sludge dispersers, and as bonding agents for paper, plastics and textile fabrics. They are very useful as anti-redeposition agents in detergents, as detergent hydrotropes and pacifiers, in dry cleaning detergents, foam stabilizers for shampoos, stabilizers for high density and low density detergents, foam stabilizers for drilling of oil or gas wells, latex stabilizers, hydraulic fluid emulsion stabilizers, emulsifiers in emulsion polymerization reactions, emulsifiers for agricultural pesticides such as insecticides, fungicides, herbicides, etc., inhibitors for clay hydration slushing, oil corrosion inhibitors, engine oil rust inhibitors, textile fiber lubricants, complexing agents for liquid-liquid extracts, dye receptors for polypropylene, dye fixing agents, pigment dispersants in pigment printing, fluidizing agents for paper coating slurries, pitch dispersants; adhesives in place of starch, casein, synthetic latices and the like; anti-static agents for polystyrene and other plastics, tackifiers for polyolefins and other plastics, flexibilizing agents for phenolic and other thermosetting resins, dispersants and gloss improvers in floor wax polishes, thickening agents in non-aqueous systems, as membranes for dye-setting and filtration, as adhesion promoters for paperboard to nylon and as dye receptors for Creslan. They are also useful as additives to waxes to lower melt viscosity, improve flexibility, gloss, or hardness. They are useful as ink acceptors for surface printing of high density polyethylene bottles, absorbents for tobacco tars in cigarette filters, absorbents for toxic gases and vapors, thickeners for petroleum oils and oil based paints; as coating for adhesive tapes and as components in adhesive hot melts, melting point dispersants for natural and synthetic resins, as reinforcing agents for glue reducers of the hydrophobic character of polar resins.

The reaction products are excellent dye receptors for polyolefin fibers such as polyethylene, polypropylene and polybutene. They add strength and good dyeing properties when employed with rayon, both viscose and acetate. They are excellent sizers for glass fibers since they have the adhesion due to the heterocyclic N-vinyl units but better lubricity because of the presence of alkoxy- or aryloxy-ethyl groups in the polymer. The reaction products improve the gloss of waxes and polishes. They are better soil-suspending agents than the corresponding unreacted products synthetic detergents. They are useful as soil dispersing agents for dry cleaning media. They are useful as anti-static agents for synthetic fibers. In the textile industry, they are useful in the preparation of anti-static agents, lubricants, waxes and dye assistants for dye leveling agents. They are also useful as tackifiers, flocculators, and gelling agents.

The reacted products display dispersing and detergent properties when incorporated into petroleum products such as kerosene, fuel oils, jet fuels and other combustible hydrocarbon liquids. They readily disperse gums, resins (asphaltenes) in such products.

The reacted products are also useful as mold release lubricants, as anti-tack and anti-block agents, as anti-static agents for films and textile fibers, and as flattening, softening and sizing agents for textiles. They are compatible with petroleum resins and the mixture employed in water-proofing, pipe coating compounds, and as concrete-curing compounds to insure the deposition of a water-proof membrane. In carbon paper, the reaction products serve as a vehicle for carrying the color and prevent the ink from soaking completely into the paper.

The reaction products form halogen adducts with elemental iodine, iodine monochloride and iodine monobromide. The iodine adducts are prepared by gently heating the reaction product until it melts and with constant stirring adding elemental iodine or a solution of elemental iodine in alcohol or carbon tetrachloride or a mixture thereof. From 2.5% to 25.0% by weight of iodine may be incorporated to the molten product. The resulting iodine adduct is soluble in a pharmaceutical grade mineral oil and other unctuous materials. The iodine adduct may be incorporated in powders, ointments, salves, suppositories, and toiletry preparations (cosmetics and soaps) to yield antiseptic and germicidal compositions which impart a soft, smooth and softening effect to the skin.

The reaction products are excellent V.I. improvers in lubricating oils and as additives to mineral oils for preparation of hydraulic fluids. They are useful additives to automobile polishes to increase gloss and as rust inhibitors in priming and finishing paints for metals.

While the present invention has been described and illustrated with respect to the alkoxy- and aryloxy-ethylation of polymers of heterocyclic N-vinyl monomers, we have found, as a result of our experimentation therewith, that one mole of a 5-, 6- and 7-membered lactam may also be alkoxy- or aryloxy-ethylated with 0.05 to 10 moles of vinyl ether under the same conditions as above described. As examples of such lactams, the following are illustrative:

2-pyrrolidone
5-methyl-2-pyrrolidone
5,5-dimethyl-2-pyrrolidone
5-ethyl-2-pyrrolidone
5-methyl-5-ethyl-2-pyrrolidone 2-piperidone
6-methyl-2-piperidone
6-ethyl-2-piperidone
6,6-diethyl-2-piperidone
caprolactam
7-methyl caprolactam
7-ethyl caprolactam
7,7-diethyl caprolactam In addition to the foregoing lactams, N-substituted lactams containing an alkyl of from 1 to 18 carbon atoms, amino alkyl of from 1 to 18 carbon atoms, or hydroxy alkyl of from 2 to 18 carbon atoms may also be employed in the reaction with the vinyl ethers. Depending upon the amount of vinyl ether employed and consumed, mono-, di-, tri- and poly-alkoxy- or aryloxy-ethylation will take place in the same manner and at the active sites, i.e., at the alpha and omega carbon atoms to the carbonyl and on the alpha carbon atom of the N-alkyl, N-amino alkyl or N-hydroxy alkyl.

We have also found that by heating one mode of a cyclic imide or cyclic anhydride with 0.05 to 10 moles of a vinyl ether under the same conditions as above described, alkoxy- or aryloxy-ethylated cyclic imides and cyclic anhydrides are obtained in which the alkoxy- or aryloxy-ethyl group is added directly to the carbon atom alpha to the carbonyl in said imide or anhydride, i.e., in 3-position of such imide or anhydride. The imides and anhydrides that may be reacted with the vinyl ethers include succinimide, N-methyl succinimide, diglycolyl-imide, N-methyl diglycolylimide, glutarimide, N-methyl glutarimide, succinic anhydride, glutaric anhydride and diglycollic anhydride (2,6-diketodioxane).

The 3-alkoxy- and 3-aryloxy-ethylated cyclic imides and anhydrides are especially useful for incorporation into polyalkylene plastics, such as polyethylene, polypropylene and polybutene, to improve the dye receptivity thereof either in sheet form, fiber or fabric. They are especially useful as ashless dispersants and rust inhibitors in a variety of lubricating oils for engines and turbines.

The 3-alkoxy-ethylated cyclic anhydrides, wherein the alkyl of the alkoxy contains at least 20 carbon atoms, are readily condensed with primary amines, di- and poly-amines to yield a new class of sludge dispersants for lubricating oils.

It will be apparent to those skilled in the art that in the simultaneous copolymerization and terpolymerization reaction of the present invention alkoxy- and aryloxy-ethylated tetra-, penta-, and hexa-polymers may also be obtained by employing one mole of a mixture of 3, 4, 5, or 6 different polymerizable monomers enumerated above. In such instances the actual proportions constituting the monomer mixture in the simultaneous polymerization and alkoxy- or aryloxy-ethylation is immaterial so long as the mixture of monomers contains at least 5 mole percent of a heterocylic N-vinyl monomer having a carbonyl functionality. The polymerizable monomers in such mixture may be others than those described above. In other words, if the mixture of monomers contains at least 5 mole percent of heterocyclic N-vinyl monomer and such mixture is soluble in the inert organic solvent, the mixture will polymerize and alkoxy- or aryloxy-ethylate in accordance with the present invention to yield a large variety of polymeric products having varying solubility characteristics in polar and nonpolar solvents.

We claim:

1. The process of preparing alkoxy- and aryloxy-ethylated polymers of heterocyclic N-vinyl monomers which comprises simultaneously polymerizing and alkoxy- or aryloxy-ethylating by heating one mole of a material of the group consisting of a monomer of a heterocyclic N-vinyl monomer having a carbonyl function adjacent to the nitrogen in its heterocyclic moiety selected from the class consisting of N-vinyl succinimide, N-vinyl diglycolyl-imide, N-vinyl glutarimide, N-vinyl-3-morpholinone, N-vinyl-5-methyl-3-morpholinone, N-vinyl-5-ethyl-3 - morpholinone, N-vinyl oxazolidone and N-vinyl 5-, 6- and 7-membered lactams of the formula

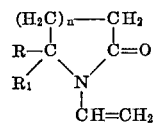

wherein R and R₁ are selected from the group consisting of hydrogen, methyl and ethyl and $n$ is an integer of from 1 to 3, and a comonomer mixture containing from 5 to 99 mole percent of said heterocyclic N-vinyl monomer and from 1 to 95 mole percent of a monoethylenically unsaturated polymerizable monomer selected from the class consisting of vinyl esters, vinyl ketone, vinyl cyclohexane, styrene, vinyl pyridine, acrylic acid, acrylate esters, methacrylonitrile and acrylamides with 0.05 to 10 moles of vinyl ether in solution of inert organic solvent common to said monomer, comonomer mixture and vinyl ether in the presence of 0.025 to 0.2 mole of organic peroxide catalyst per mole of vinyl ether at a temperature of from about 80° to 200° C.

2. The process according to claim 1 wherein the monomer of heterocyclic N-vinyl monomer is the monomer of N-vinyl pyrrolidone.

3. The process according to claim 1 wherein the monomer of heterocyclic N-vinyl monomer is the monomer of N-vinyl piperidone.

4. The process according to claim 1 wherein the monomer of heterocyclic N-vinyl monomer is the monomer of N-vinyl caprolactam.

5. The process according to claim 1 wherein the monomer of the heterocyclic N-vinyl monomer is 5-methyl-N-vinyl pyrrolidone.

6. The process according to claim 1 wherein the monomer of the heterocyclic N-vinyl monomer is N-vinyl succinimide.

7. The process according to claim 1 wherein the comonomer mixture contains 75 mole percent of N-vinyl pyrrolidone and 25 mole percent of vinyl acetate.

References Cited

UNITED STATES PATENTS 3,214,498  10/1965  Bauer _____ 260—885
3,301,808  1/1967  Mack et al. _____ 260—885

MURRAY TILLMAN, *Primary Examiner.*

J. T. GOOLKASIAN, *Assistant Examiner.*